United States Patent
Nageswaran

Patent Number: 6,088,651
Date of Patent: Jul. 11, 2000

[54] NAME SPACE SEARCH MECHANISM THAT SEARCHES FOR NAMES AND/OR UNIQUE IDENTIFIERS IN A BOUNDED PERIOD OF TIME

[75] Inventor: Parthasarathy Nageswaran, Rochester, Minn.

[73] Assignee: International Business Machines Corporation, Armonk, N.Y.

[21] Appl. No.: 08/753,030

[22] Filed: Nov. 19, 1996

[51] Int. Cl.[7] .................................................. G06F 17/00
[52] U.S. Cl. ................................. 701/208; 707/3
[58] Field of Search ................... 701/200, 201, 701/206–211, 217, 202; 707/3–5; 709/223, 224, 226

[56] References Cited

U.S. PATENT DOCUMENTS

| | | | |
|---|---|---|---|
| 4,220,994 | 9/1980 | Hendrickson | 701/202 |
| 4,481,584 | 11/1984 | Holland | 701/200 |
| 4,954,958 | 9/1990 | Savage et al. | 701/202 |
| 5,784,059 | 7/1998 | Morimoto et al. | 701/208 X |

*Primary Examiner*—William A. Cuchlinski, Jr.
*Assistant Examiner*—Edward Pipala
*Attorney, Agent, or Firm*—Steven W. Roth

[57] ABSTRACT

The present invention provides an enhanced computer resource search mechanism that can be used to search for computer system resources using either computer resource names or computer resource unique identifiers. This is accomplished via a search mechanism that is comprised of an enhanced indexing structure and an associated search engine. The indexing structure is made up of a series of entries that are resource name/bag pairs. A bag is a composite structure that is itself made up of one or more UID/location pairs. Each pair within a bag represents one instance of the subject name within the name space under consideration. The search engine uses this enhanced indexing structure to perform bounded searches of a name space based on a presented resource name or UID.

6 Claims, 6 Drawing Sheets

NAME SPACE SEARCH MECHANISM THAT SEARCHES FOR NAMES AND/OR UNIQUE IDENTIFIERS IN A BOUNDED PERIOD OF TIME

FIELD OF THE INVENTION

The present invention relates to data processing systems. More particularly, the present invention relates to name space search mechanisms.

BACKGROUND OF THE INVENTION

Computer systems are often thought of as extremely complicated devices that represent unfathomable complexity. While this may be true to some extent, those knowledgeable in the computer system field realize that many of the problems that face computer system designers are very similar to problems that face each of us in every day life. Once such problem is that of identifying and finding computer system resources. Just like a person's name is used to look up the person's phone number (e.g., through the use of a phone book), computer system resource names are used to gain access to computer system resources. As an aside, we use the term "computer system resource" here to refer to just about any resource that relates to computer systems. For example, a computer system resource may be as small as a single piece of information that is stored in a computer system or it may be as large as an entire computer system, or network of computer systems.

Continuing the analogy, we all know that more than one person might have the same name. For example, phone books often have multiple entries for common names such as John Smith. When this is the case, we need further information about the particular John Smith (e.g., his street address) to pick out which John Smith to call. Like people, different computer system resources may well have the same name, but they also will usually be identified with certain additional information. This additional information often comes in the form of what is referred to as a unique identifier (UID for short). While there can be several different computer system resources with the same name, there is only one UID for each resource within a given name space. By "name space," we mean the total set of computer system resources that are under consideration. In our example, a name space can be thought of as being analogous to a region for which the phone book is valid.

While the flexibility associated with being able to identify a computer system resource through either a name or a UID can be thought of as an advantage, it has the disadvantage of requiring specialized search mechanisms (i.e., one for name-based searches and one for UID-based searches). The need for specialized search mechanisms means that a UID search mechanism cannot search based on resource name and that a name-based search mechanism cannot search based on a UID. If a resource name is given to a UID search mechanism, the search will fail even though there are resources present with the subject name. Similarly, if a UID is given to a name search mechanism, the search will fail even though the UID accurately identifies a particular resource.

These limitations create two significant problems. First, the need for different search mechanisms means that the entity making the request (i.e., usually an application program) must blindly choose one of the two search mechanisms to perform an initial search. If the initial search fails, the program must attempt the search using the other search mechanism. While one might speculate that a solution to this problem would be to provide the application program with the intelligence to correctly choose which search mechanism to use, it turns out that such an idea would, in practice, be inappropriate because subsequent changes to the name or UID format would require changes to each dependent application program (i.e., instead of just one change to one search mechanism). Thus, application programs are left with this two-phase search approach, which, as one can imagine, is extremely wasteful from the standpoint of overall computer system performance.

The second significant problem with today's mechanisms is the fact that each search mechanism requires the use of a specialized indexing structure. (Indexing structures are used by search mechanisms to perform searches for computer system resources). The use of separate indexing structures is a problem because these structures are typically quite large, which means that they are expensive to house within the computer system's memory.

Without a different approach to name space searching, computer system resource access will continue to suffer from these inadequacies.

SUMMARY OF THE INVENTION

Accordingly, a principal object of this invention to provide an enhanced computer resource search mechanism.

It is another object of this invention to provide an enhanced computer resource search mechanism that can be used to search for computer system resources using either computer resource names or computer resource unique identifiers.

It is still another object of this invention to provide an enhanced computer resource search mechanism that performs bounded searches for computer system resources via either computer resource names or computer resource unique identifiers.

It is yet another object of this invention to provide an enhanced computer resource search mechanism that performs bounded searches for computer system resources via either computer resource names or computer resource unique identifiers using a single indexing structure.

These and other objects of the present invention are accomplished by the enhanced computer system resource search mechanism disclosed herein.

The search mechanism of the present invention is comprised of an enhanced indexing structure and an associated search engine. The indexing structure is made up of a series of entries that are resource name/bag pairs. A bag is a composite structure that is itself made up of one or more UID/location pairs. Each pair within a bag represents one instance of the subject name within the name space under consideration. For example, if the name space at issue contains three computer system resources that are each named XYZ, the bag associated with the resource name XYZ will have three entries. Each entry will provide a mapping between the UID of a given instance of a resource name XYZ and the location of that resource.

The search engine uses this enhanced indexing structure to perform bounded searches of a name space based on a presented resource name or UID. (For more information on what the term "bounded" means in this context, please consult the Overview section of this patent. The Overview section is the first section within the Description of the Preferred Embodiments section.) When the engine is presented with search information, it first determines whether the presented search information represents a resource name or a UID of a resource. If the search information is presented to the search engine in the form of a resource name, the search engine locates the resource name in the indexing structure and returns all of the resource locations contained in the associated bag. If the search information is presented to the search engine in the form of a UID, the search engine extracts the resource name from the UID, locates the name/bag pair within the indexing structure, locates the UID/location pair within the associated bag, and returns the location to the requesting application program. (Please note here that a requirement of the present invention is that the resource's name be identifiable within the resource's UID. As will be seen from subsequent examples that illustrate application of the present invention, this requirement is commonly satisfied in today's computing environments.)

DESCRIPTION OF THE PREFERRED EMBODIMENTS

Overview—Indexing and Bounded Searches

Indexes are created to speed access times to information contained within most any type of database. (For our purposes, a name space can be considered to be equivalent to a database.) Fundamentally speaking, indexes contain an identifier for a piece of information and the location of the associated information within the database. Not surprisingly, the way in which an index is designed (e.g., the form of the identifier, the choice of the location information, and the basic arrangement of the two) has a direct impact on the speed at which information contained in the associated database is accessed. Another factor that can affect access time is the amount of information that is contained in the database, and ultimately the index constructed to speed access to the information. A search mechanism that provides the same or mathematically similar access times regardless of the amount of information stored in the database is said to be a bounded search mechanism; whereas a search mechanism that provides access times that vary based on the amount of information stored in the database is said to be an unbounded search mechanism. The search mechanism of the present invention provides bounded search times for name and UID searches, something not found in the prior art. An explanation of the bounded nature of the search mechanism of the present invention is provided in subsequent paragraphs.

Detailed Description

Figure 1:
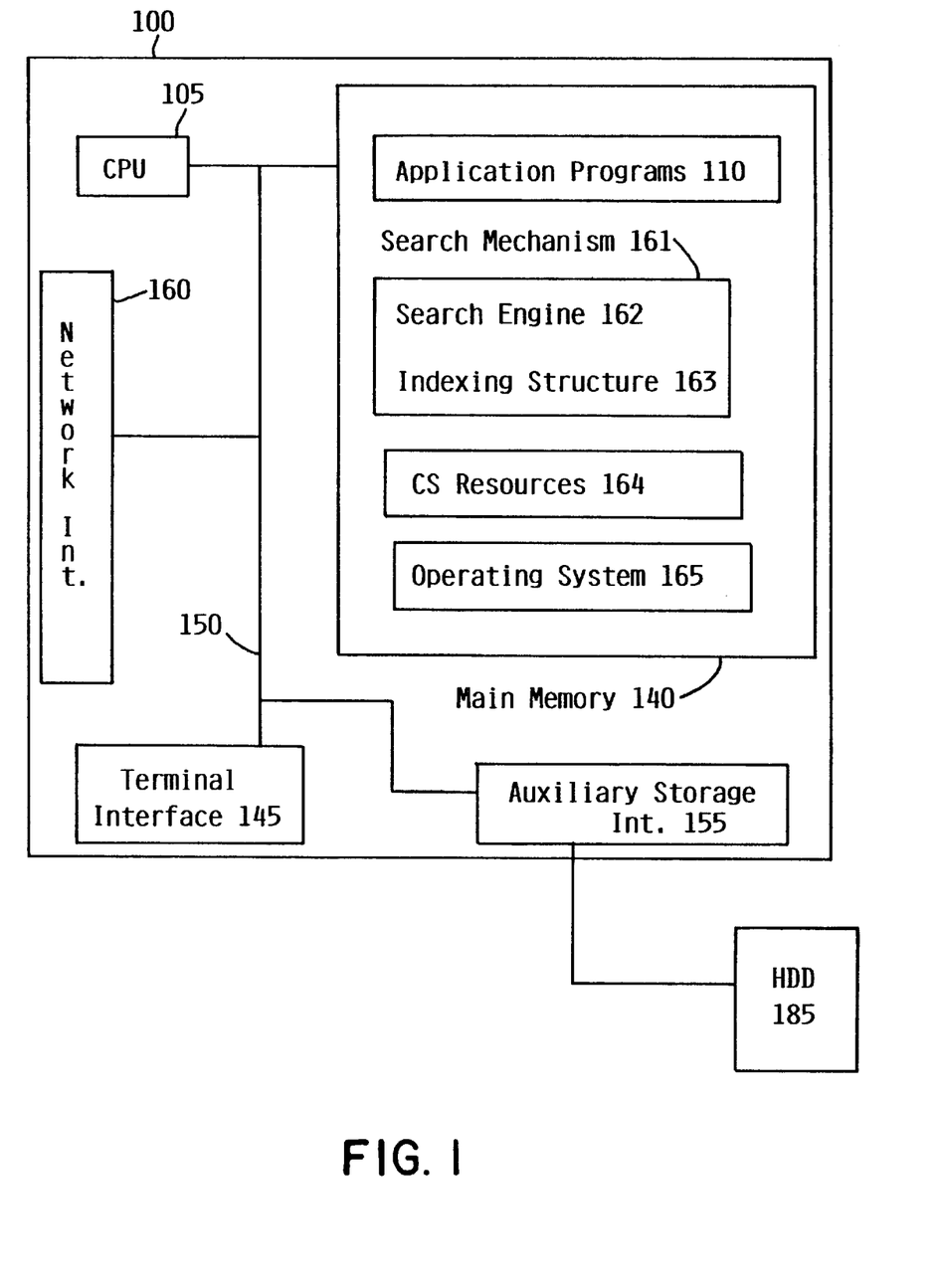
FIG. 1 is a block diagram of the computer system of the present invention.

Turning now to the drawings, FIG. 1 shows a block diagram of the computer system of the present invention. The computer system of the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus, a powerful user workstation, a smaller network computer such as those known in the industry as "thin clients," or even a medialess personal computer.

As shown in the exploded view of FIG. 1, computer system 100 comprises main or central processing unit (CPU) 105 connected to main memory 140, terminal interface 145, auxiliary storage interface 155, and network interface 160. These system components are interconnected through the use of system bus 150. Auxiliary storage interface 155 is used to connect mass storage devices (such as HDD 185) to computer system 100.

Computer system 100 utilizes well known virtual addressing mechanisms that allow programs executing on CPU 105 to behave as if they have access to a large, single storage entity instead of having to control access to multiple, smaller storage entities (e.g., such as main memory 140 and/or HDD 185). (When taken together, these smaller storage entities are said to form the "virtual memory" of a computer system. We use the term "computer system memory" to generically refer to the entire virtual memory of computer system 100.) Therefore, while application programs 110, search mechanism 161, computer system resources 164, and operating system 165 are shown to reside in main memory 140, those skilled in the art will recognize that these programs are not necessarily all completely contained in main memory 140 at the same time.

Search mechanism 161 is further shown to contain search engine 162 and indexing structure 163. Search engine 162, which is described in greater detail in the text associated with FIG. 4, is used to perform bounded name and UID searches on the information stored in indexing structure 163. Indexing structure 163 is described in further detail in the text associated with FIGS. 3A and 3B.

Operating system 165 is a multitasking operating system known in the industry as OS/400; however, those skilled in the art will appreciate that the spirit and scope of the present invention is not limited to any one operating system.

The interfaces (called input/output processors in AS/400 terminology) used in the preferred embodiment each include separate, fully programmed microprocessors used to off-load compute-intensive processing from CPU 105. However, those skilled in the art will appreciate that the present invention applies equally to computer systems that simply use I/O adapters to perform similar functions.

Terminal interface 145 is used to directly connect one or more terminals to computer system 100. These terminals, which may be non-intelligent or fully programmable workstations, are used to allow system administrators and users to communicate with computer system 100.

Network interface 160 is used to connect other computer systems and/or workstations to computer system 100 in networked fashion. The present invention applies equally no matter how computer system 100 happens to be connected to other computer systems and/or workstations, and regardless of whether the connection(s) is made using present-day analog and/or digital techniques or via some networking mechanism of the future. It is also important to point out that the presence of network interface 160 within computer system 100 means that computer system 100 may engage in cooperative processing with one or more other computer systems, workstations, network computers, etc. Of course, this in turn means that the programs shown in main memory 140 need not necessarily all reside on computer system 100. For example, one or more programs of application programs 110 may reside on another system and engage in cooperative processing with one or more programs that reside on a computer system other than computer system 100 (e.g., to gain access to computer system resources that are located on that other computer). This cooperative processing could be accomplished through use of one of the well known client-server mechanisms such as remote procedure call (RPC).

As a final preliminary matter, it is also important to note that even though the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

Figure 2A:
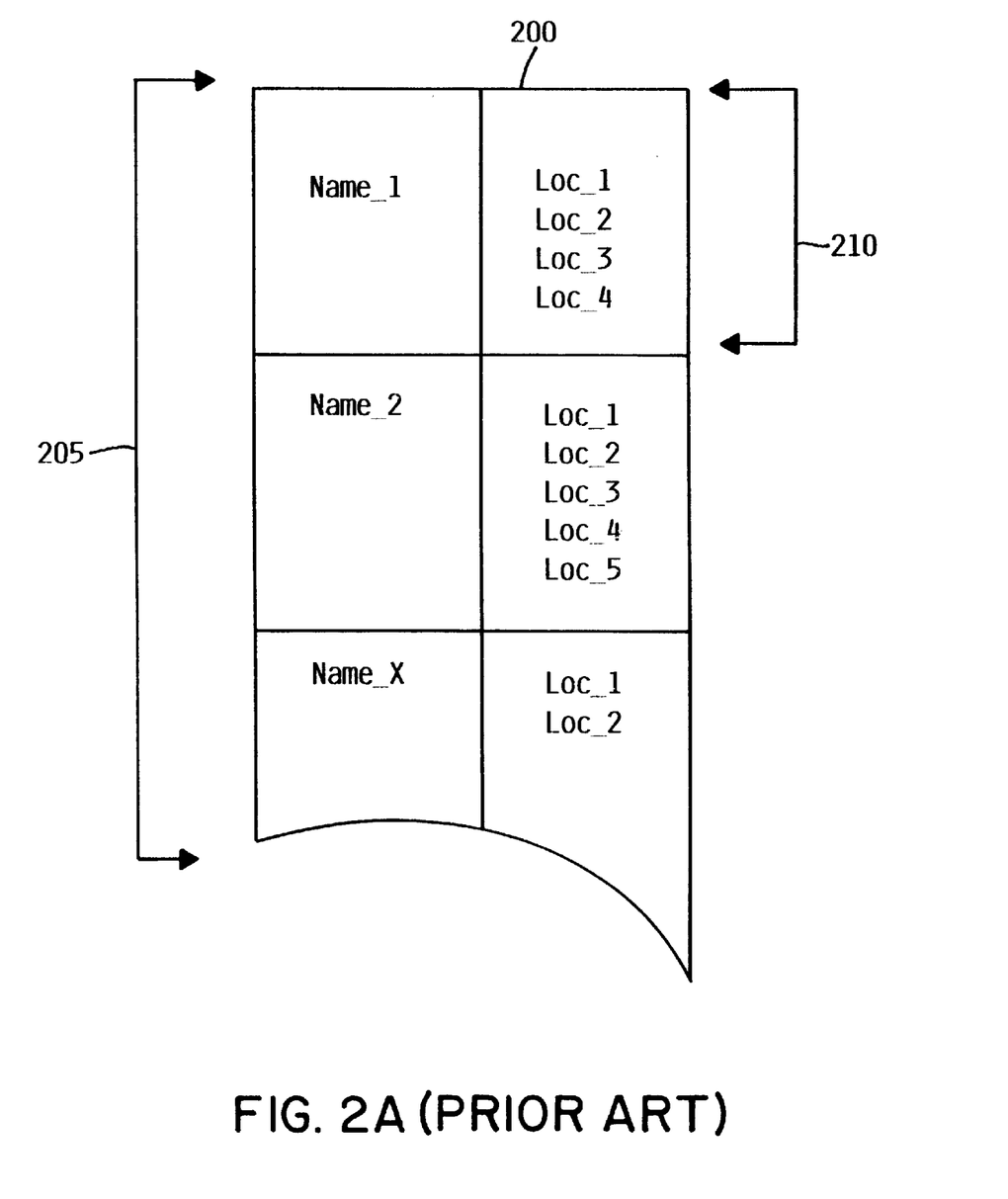
FIG. 2A is a diagram of a prior art name searching index structure.

FIG. 2A is a diagram of a prior art name searching index structure. As shown, indexing structure 200 is comprised of a series of name entries 205 that each include one or more location entries (e.g., location entries 210). When presented with search information, a prior art search mechanism that uses indexing structure 200 will attempt to match the given search information with one of the names in name entries 205. If a match is found, the locations contained in the matching name entry are returned to the requesting entity (e.g., an application program). If a match is not found, the search fails. Please note here that the search could fail because the name included in the search information was simply not present in indexing structure 200 or because the search information was presented in the form of a UID instead of in the form of a name. In the context of this patent, this latter case is of the most interest because the search would fail regardless of whether the name contained in the UID was present in indexing structure 200.

Figure 2B:
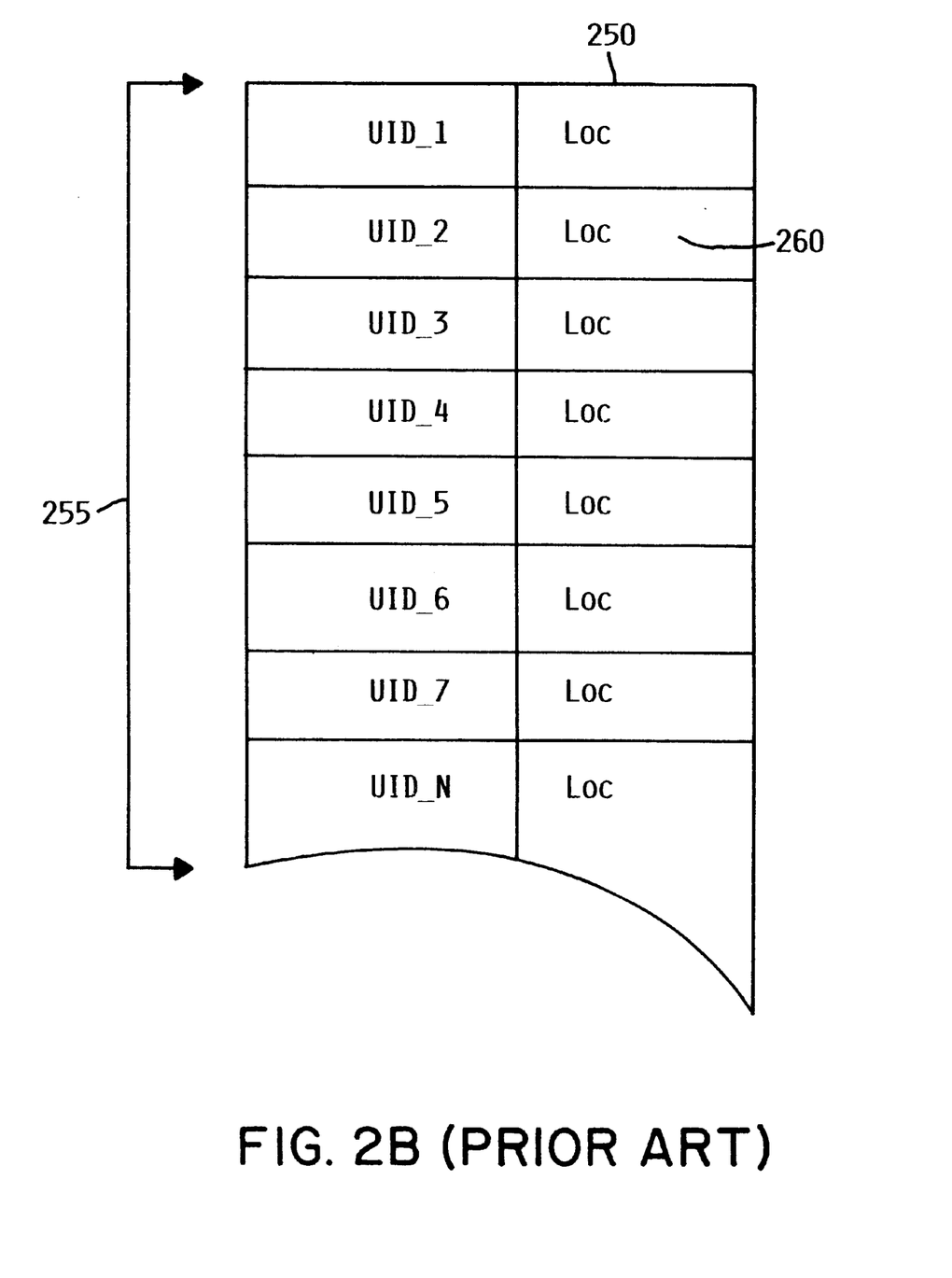
FIG. 2B is a diagram of a prior art UID searching index structure.

FIG. 2B is a diagram of a prior art UID searching index structure. As shown, indexing structure 250 is comprised of a series of UID entries 255 that each include one location entry (e.g., location entries 260). When presented with search information, a prior art search mechanism that uses indexing structure 250 will attempt to match the given search information with one of the names in UID entries 255. If a match is found, the location contained in the matching UID entry is returned to the requesting entity (e.g., an application program). If a match is not found, the search fails. Please note here that the search could fail because the UID included in the search information was simply not present in indexing structure 250 or because the search information was presented in the form of a name instead of in the form of a UID. In the context of this patent, this latter case is of the most interest because the search would fail regardless of whether the resource identified by the name was present in indexing structure 250.

Figure 3A:
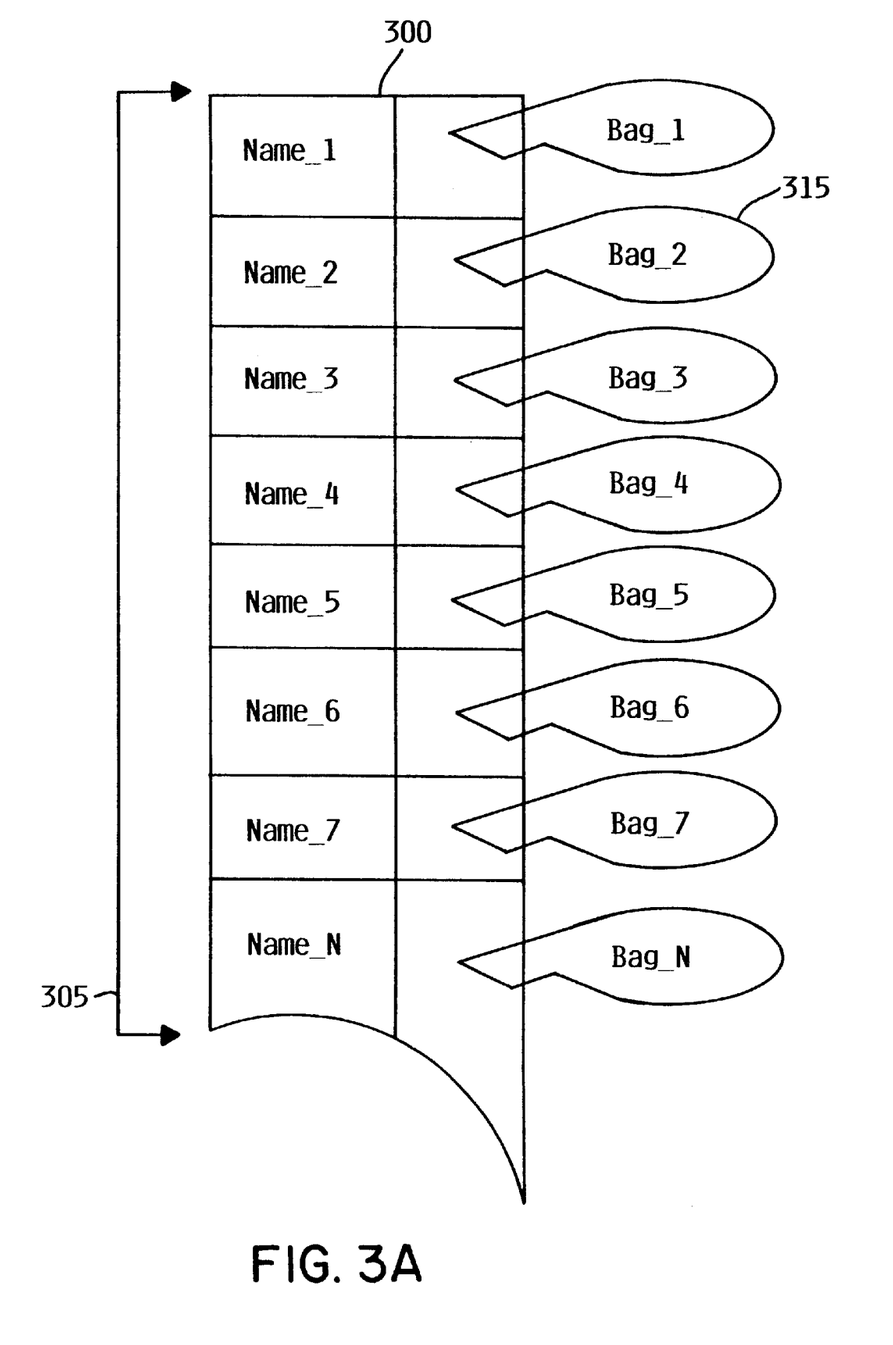
FIG. 3A is a diagram of a searching index structure constructed in accordance with the teachings of the present invention.
Figure 3B:
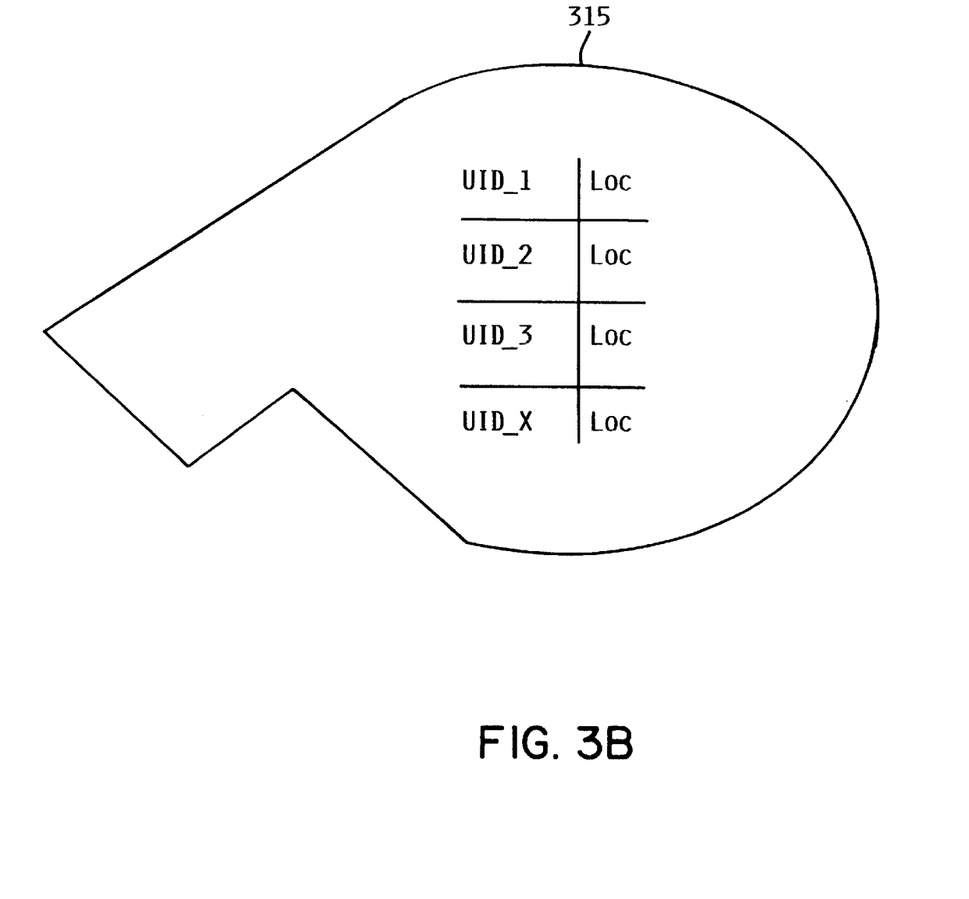
FIG. 3B is a diagram of a bag structure constructed in accordance with the teachings of the present invention.
Figure 4:
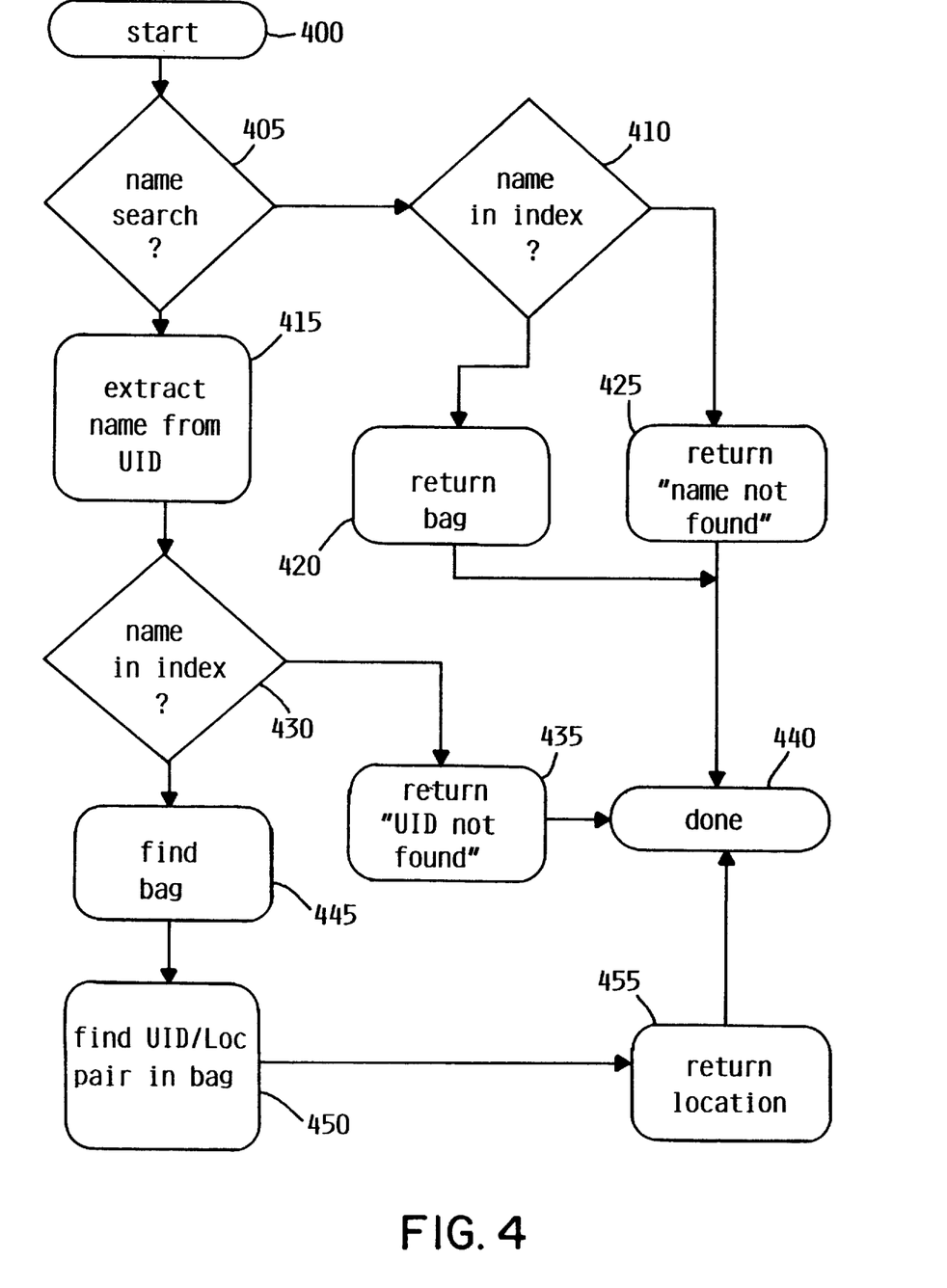
FIG. 4 is a flow diagram that shows steps used to carry out a search engine constructed in accordance with the teachings of the present invention.

FIG. 3A is a diagram of a searching index structure constructed in accordance with the teachings of the present invention. As shown, indexing structure 300 is comprised of a series of name entries 305. Each name entry contains a composite structure called a bag (e.g., bag__2 315). FIG. 3B shows an expanded view of a bag constructed in accordance with the teachings of the present invention. Bag 315 is comprised of a series of UID entries, one entry for each instance of the associated name within the name space at issue. Each UID entry is a mapping between a specific UID and a location.

FIG. 4 is a flow diagram that shows steps used to carry out search engine 162. When initiated (i.e., called or invoked by an application program), search engine 400 receives the search information from the requesting application program [block 400]. Search engine 162 next ascertains whether the search information is in the form of a name or in the form of a UID [step 405]. Those skilled in the art will appreciate that the way in which step 405 is accomplished depends upon the specifics of the name/UID architecture involved, and that the particulars of how this step is actually accomplished are not important relative to the teachings or benefits of the present invention. As indicated earlier, the only requirement that the present invention imposes upon a name/UID architecture (protocol) is that the name be obtainable fiom the UID.

If search engine 162 determines that the passed information is in the form of a name (i.e., "name form" for claim purposes), search engine 162 ascertains whether the name is within the index [block 410]. This step is accomplished via an extensible linear hashing method, although those skilled in that art will appreciate that any hashing mechanism could be used. If the name is not found within the index, search engine 162 returns an indication of "name not found" to the requesting program [block 425] and terminates its processing in block 440. If the name is found in block 410, search engine 162 returns the associated bag of locations [block 420]. Its processing then ends in block 440.

If search engine 162 determines that the search information has been provided in the form of a UID, search engine 162 will extract the resource name from the UID [block 415] and determine whether the name is present in the index [block 430]. If the name is not found within the index, search engine 162 returns an indication of "UID not found" to the requesting program [block 435]. Its processing then ends in block 440. If the name is found in block 410, search engine 162 locates the correct bag [block 445], uses the passed UID to locate the correct location [block 450], and returns the location to the requesting program [block 455]. Its processing then ends in block 440.

Note here that the combination of indexing structure 300 and search engine 162 provides bounded search times for name searches and for UID searches. Since a hashing function is used to index into indexing structure 300, the access time is substantially the same no matter how many name entries 305 are present.

The following paragraphs describe two examples of how the present invention applies to two different name space situations. The first example pertains to a name space that relates to an object oriented programming environment, while the second example pertains to a name space for network file access.

Object-Oriented Programming Example

First, a few sentences on Object-Oriented programming. As its name suggests, central to Object-Oriented programming is the notion of an object. Objects can be thought of as autonomous agents which work together to perform the tasks required of the cornputer system. A single object represents an individual operation or a group of operations that are performed by a computer system upon information controlled by the object. The operations of objects are called "methods" and the information controlled by objects is called "object data" or just "data." Methods and object data are said to be "encapsulated" in the object. When a method of one object needs access to the data controlled by a second object, it is considered to be a client of the second object. To access the data controlled by the second object, one of the methods of the client (i.e., a client method) will call or invoke the second object to gain access to the data controlled by that object. One of the methods of the called object (i.e., a server method in this case) is then used to access and/or manipulate the data controlled by the called object.

In the context of this invention, object-oriented application programs repeatedly have a need to access certain objects. The way in which an object can be known to an application program is by name or by UID. Consider four objects A, B, X, and Y, and the following containment relationship: assume that that object A contains object B as data, that object B contains object X as data, and that object X contains object Y as data, which also means that object A contains objects X and Y, and that object B contains object Y. When an application program wants to access the data controlled by object Y, it must use object Y's methods, which means that it must gain access to object Y. To do so, it might have information in the form of object Y's UID, specified as "::A::B::X::Y" under IBM's SOM programming model, or it might have information in the form of object's name (i.e., "Y").

Prior art search mechanisms would require the application program to blindly attempt to locate object Y via a name search mechanism or via a UID search mechanism. As we described earlier this is wasteful from a performance standpoint (i.e., because of the time needed to perform the two-phase search) and from an expense standpoint (i.e., because of the need to house two search mechanism within the computer system's memory). The search mechanism of the present invention, however, can handle either situation with equal grace and efficiency, and via use of only a single indexing structure. If the search information is presented in the form of the object's name ("Y"), the mechanism locates the name within the index and returns the locations found in the associated bag. If the search information is presented in the form of the object's UID ("::A::B::X::Y"), the search mechanism of the present invention, ascertains the object's name ("Y"), locates the name entry within the index, and then uses the UID to select the proper location from those found in the bag associated with the name. Once selected, the location is returned to the requesting application program.

Network Example

As mentioned, this example involves a name space for network file access. Browser-based network file access has become increasingly popular. The access is typically performed using internet and intranet application programs via HTTP (Hypertext transaction protocol). Resource names are included within the UID of this protocol, which means that it is a name/UID architecture that is supported by search mechanism 161 of the present invention. Consider for example the following UID (known as a URL in HTTP vernacular): "www.ibm.com/News/patents.html." The name of the file here is "patents.html." Consider further that a client browser (perhaps in an intranet environment) might want to access the file using just its name (i.e., "patents.html") or via its complete URL.

As described above, prior art search mechanisms would require the browser program to blindly attempt to locate the patents.html file via a name search mechanism or a via a UID search mechanism. Again, though, the search mechanism of the present invention, however, can handle either situation with equal grace and efficiency, and via use of only a single index.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer comprising:

a bus;

a central processing unit;

computer system memory, said computer system memory being connected to said central processing unit via said bus; and a name search mechanism contained in said computer system memory for execution on said central processing unit, said name search mechanism using a single indexing structure to locate at least one computer system resource, wherein said at least one computer system resource can be located by said name search mechanism via a computer system resource name or via a computer system resource unique identifier (UID).

2. The computer system of claim 1 wherein said name search mechanism is used to locate said at least one computer system resource in a bounded period of time.

3. A program product, said program product comprising:

a name search mechanism, said name search mechanism using a single indexing structure to locate at least one computer system resource, wherein said at least one computer system resource can be located by said name search mechanism via a computer system resource name or via a computer system resource unique identifier (UID); and signal bearing media bearing said name search mechanism.

4. The program product of claim 3 wherein said name search mechanism is used to locate said at least one computer system resource in a bounded period of time.

5. The program product of claim 3 wherein said signal bearing media is transmission type media.

6. The program product of claim 3 wherein said signal bearing media is recordable media.

* * * * *